(12) United States Patent  (10) Patent No.: US 7,832,748 B2
Cariou et al.  (45) Date of Patent: Nov. 16, 2010

(54) STRUCTURE SUPPORTING A MOTOR VEHICLE FRONT END ASSEMBLY COMPRISING COUPLING MEANS IN THE FORM OF A HOLLOW BODY OF A MINI-CRADLE WITH SIDE MEMBERS, AND CORRESPONDING VEHICLE

(75) Inventors: Anthony Cariou, Le Mans (FR); Julien Berson, Le Mans (FR); Joel Touffait, Ruaudin (FR); Jean Veneau, Ardenay sur Merize (FR)

(73) Assignee: Auto Chassis International SNC, Le Mans (FR)

( * ) Notice: Subject to any disclaimer, the term of this patent is extended or adjusted under 35 U.S.C. 154(b) by 0 days.

(21) Appl. No.: 11/996,564

(22) PCT Filed: Jul. 10, 2006

(86) PCT No.: PCT/FR2006/050692

§ 371 (c)(1),
(2), (4) Date: Jun. 13, 2008

(87) PCT Pub. No.: WO2007/010157

PCT Pub. Date: Jan. 25, 2007

(65) Prior Publication Data

US 2008/0315571 A1  Dec. 25, 2008

(30) Foreign Application Priority Data

Jul. 18, 2005  (FR)  .................................. 05 07623

(51) Int. Cl.
*B60G 7/02*  (2006.01)
*B62D 21/00*  (2006.01)

(52) U.S. Cl. ................................ 280/124.109; 180/312; 180/299

(58) Field of Classification Search ................. 180/312, 180/232, 295, 299; 280/124.109; 296/187.09
See application file for complete search history.

(56) References Cited

U.S. PATENT DOCUMENTS

| 4,240,517 | A | * | 12/1980 | Harlow et al. ............... 180/295 |
| 5,685,599 | A | | 11/1997 | Kitagawa |
| 7,520,514 | B2 | * | 4/2009 | Ogawa et al. ......... 280/124.109 |
| 7,584,815 | B2 | * | 9/2009 | Ogawa et al. ............... 180/312 |
| 2001/0020774 | A1 | | 9/2001 | Suzuki |
| 2001/0022437 | A1 | | 9/2001 | Suzuki |
| 2005/0275604 | A1 | * | 12/2005 | Park ............................ 345/63 |

\* cited by examiner

*Primary Examiner*—Paul N Dickson
*Assistant Examiner*—Keith Frisby
(74) *Attorney, Agent, or Firm*—Oblon, Spivak, McClelland, Maier & Neustadt, L.L.P.

(57) ABSTRACT

A structure for a motor vehicle front end assembly includes a mini-cradle having mounted thereon a suspension arm for each wheel of the front end assembly. The suspension arm has the shape of a boomerang. The supporting end of the suspension arm is coupled to a wheel. A front articulation end (point A) and a rear articulation end of the arm are coupled to the mini-cradle. The mini-cradle has a body and two side rails that extend towards the vehicle front. The two side rails are coupled, via a coupling unit, to a side member of the vehicle in a zone located forward, relative to the longitudinal axis of the vehicle, of point A of the suspension arm. The coupling unit includes at least one hollow body allowing a through screwing unit to couple the rail with the side member.

20 Claims, 3 Drawing Sheets

STRUCTURE SUPPORTING A MOTOR VEHICLE FRONT END ASSEMBLY COMPRISING COUPLING MEANS IN THE FORM OF A HOLLOW BODY OF A MINI-CRADLE WITH SIDE MEMBERS, AND CORRESPONDING VEHICLE

BACKGROUND OF THE INVENTION

I. Field of the Invention

The field of the invention is that of the motor industry. More specifically, the invention relates to subframes supporting the engines of motor vehicles or rear ends.

II. Description of Related Art

In a commonly used method, an engine subframe comprises two shells made from pressed sheet metal and joined together, by welding for example.

One of the functions of this subframe is to withstand the forces generated by the engine torque during the acceleration or deceleration of the vehicle.

It should be noted, with reference to FIG. 1, that a subframe of this kind is fixed to the rear part of the vehicle body. A shock absorber 2 or "add-on" which is independent of the subframe and has no contact with it, except in case of impact, is placed in the extension of the subframe.

Such a subframe is also coupled to lower arms 3 supporting the wheel or carrying wheel support means 31 (shown schematically), an anti-roll bar 32 connecting these arms and being held on the subframe. Such an engine subframe is therefore an intermediate structure between the body and the steering members of the front end.

A subframe of this type terminates at its forward end approximately at the position of the wheel axle, and is consequently known as a "short subframe", by contrast with a full subframe which extends to the front end cross-member behind the fender.

These subframes facilitate preparation for assembly in the bodywork assembly plant, since they can be prepared off-line, with the steering, the anti-roll bar, the torque link, and the wishbones being assembled before the final coupling to the body.

A front end assembly made in this way is very compact.

In operation, it must allow the free travel of the surrounding movable elements such as the suspension arms (points A, B and E), the tie rods, and the lateral transmissions of the anti-roll bar.

The impact energy absorption function of short subframes imposes two significant design constraints on these members.

Firstly, the short subframe must withstand forces originating from the deformable front structure (add-on) in a frontal impact, these forces being primarily oriented in the direction X of the vehicle. The force path will therefore require shapes and sections designed to "absorb" its planned crushing.

At the same time, the suspension arm is required to have a failure resistance such that it becomes fusible only above a level of loading dictated by clearly defined safety criteria. Consequently, it must not have excessively thin cross sections, but it is also impossible to form through holes in its surface, particularly in line with the front side member, for access for screwing the subframe to the body in the body assembly plant.

The frame is also connected to the body in its rear part by resilient blocks which are housed in enclosures under the floor.

In its front part, in view of the aforementioned context and constraints, the fixing can only be made to the rear of the joint A of the arm on the subframe (such an arm is shown in FIGS. 2 and 3).

Furthermore, manufacturers' specifications require that this fixing should be carried out by means of a filtration block located immediately below the side member.

The front fixing is therefore considerably offset in the direction Z from the horizontal plane (approximately 250 mm from the area of point A).

In this space, particularly on the left-hand side, the protrusion of the "nose" 41 of the gearbox 4 makes it particularly difficult to design the front fixing of the transmission to conform to the specifications concerning rigidity. It should be noted that current specifications require a rigidity Ky of 100 daN/mm at the point identified by 32. This value of rigidity makes it necessary to design, in a very confined space, a vertical fixing of the block 33 which is very "floating", but sufficiently rigid to meet the specifications.

Different topologies for the implementation of the fixing of the short subframe to the front side members have been proposed in the prior art.

According to a first known method, the connection is provided by an articulated link, equipped with resilient joints at each end, connecting the subframe to the side member. This solution is used in an automobile such as the RENAULT MEGANE (registered trademark).

This solution complicates the mounting of the assembly, since there are numerous assembly points (upper and lower).

Furthermore, a link positioned vertically and pivoted at each end cannot develop any transverse rigidity and therefore does not meet the aforementioned specification (100 daN/mm).

Another solution, shown in FIGS. 2 and 3, is to divide the path to be covered between the side member 5 and the subframe 1 into two parts. A first structure 331, welded to the side member 5, extends down to mid-height, while another structure 332 rises from the subframe 1 to meet it. This solution is used by automobile manufacturers such as MITSUBISHI and VOLVO (registered trademarks).

The fixing between the two elements is provided by rigid connection (screwing) or by resilient blocks. In this case also, the connection is not made at the correct height, since no "downward extending" structure is permitted, and all the vertical offsetting must be provided from the subframe.

There are also known solutions using a structure welded to the subframe, also called a "horn", made by pressing or from bent tubing and taking up the offset in the direction Z, and especially in the direction Y, between the lower part of the subframe and the upper part for connection to the side member. This solution is used by an automobile manufacturer such as BMW MINI and on an automobile such as the FORD FIESTA (registered trademarks).

This offset in the direction Y is not possible in some applications, particularly when it gives rise to interference with the gearbox in a section X.

BRIEF SUMMARY OF THE INVENTION

The object of the invention is, in particular, to overcome the drawbacks of the prior art.

More specifically, the object of the invention is to propose a method for fixing a short subframe to a side member, which provides a high degree of rigidity in the fixing within a confined space, while allowing the passage of the screwing means intended to form part of the fixing.

Another object of the invention is to provide a method of this kind which preserves the rigidity of the suspension arms, particularly because it avoids the piercing of these arms.

Another object of the invention is to provide a method of this kind which enables the fixing to be carried out in front of the point A of the suspension arms carried for the subframe.

Another object of the invention is to provide a method of this kind which imparts satisfactory transverse rigidity to the fixing.

Yet another object of the invention is to provide a method of this kind which enables the vertical offset between the short subframe and the side members to be taken up, essentially by means of the short subframe.

Yet another object of the invention is to provide a method of this kind which enables a gearbox to be located in the immediate proximity of the short subframe.

Yet another object of the invention is to provide a method of this kind which enables resilient joints to be used between the short subframe and the side members.

Yet another object of the invention is to provide a method of this kind which is simple to design and easy to implement.

These objects, and others which will be made clear subsequently, are achieved by the invention which proposes a structure supporting a motor vehicle front end, comprising a short subframe on which a suspension arm is mounted for each wheel of said front end, said suspension arm being of the boomerang-shaped type in which one end, called the support end (E) of a rotating part is intended to be coupled to a wheel, while the other end, called the front joint (A), and the median part of the arm, called the rear joint (B), are intended to be coupled to said short subframe, said short subframe having a body on either side of which there extend toward the front of the vehicle two rails, each intended to be coupled by screwing to a side member of said vehicle, characterized in that each of said rails has means for coupling to said side member in an area located in front of said point A of said suspension arm with respect to the longitudinal axis of said vehicle, said coupling means comprising at least one hollow body for the passage of screwing means for the purpose of coupling said rail to said side member. This front fixing structure design has limited overall dimensions in the directions X and Y of the vehicle, while permitting access, for the screwing means, to the screwed connection between the short subframe and the side members.

Furthermore, this fixing method can be used in front of point A of the suspension arms and therefore avoids the piercing of these arms (for the passage of the fixing means).

In a preferred solution, said hollow body or bodies are composed of at least one tubular part extending in one piece between said side member and said rail.

Thus the overall dimensions of the fixing are reduced to no more than the outside diameter of the tubular part.

Furthermore, such a part ensures that optimal bending rigidity is obtained, in accordance with the specifications issued by motor vehicle manufacturers.

In an advantageous solution, said rail or rails have a housing in which said coupling means are inserted.

Preferably, said short subframe is of the double shell type, at least the upper shell having at least one hole for the passage of said tubular part or parts.

This ensures an effective connection between the tubular part or parts and the short subframe.

A short subframe of this type is also correctly designed to absorb many of the forces if the vehicle suffers a frontal impact.

Advantageously, each of the shells of said short subframe has at least one hole for the passage of said tubular part or parts.

In this case, said tubular part or parts are preferably welded to each of said shells.

This contributes to the quality of the connection between the tubular part or parts and the short subframe. At the same time, this arrangement tends to increase the bending rigidity of the tubular part or parts.

In a preferred embodiment, said coupling means comprise at least one resilient joint.

In this case, said resilient joint or joints are preferably force-fitted into said body of said coupling means.

This provides satisfactory fastening of the resilient joints without increasing the overall dimensions of the fixing between the short subframe and the side members.

Preferably, said tubular part or parts have two portions, each in the extension of the other, one of said portions having a smaller diameter than the other portion and being intended to receive said joint by force fitting.

According to another advantageous feature, each of said rails extends in the vicinity of said side member from a main body and has a terminal part curved toward said side member until it is in vertical alignment with said side member.

Thus, the structure of the short subframe itself makes up the offset between the short subframe and the side members.

This contributes to an improvement in the transverse rigidity of the fixing, the means for coupling the short subframe to the side members extending substantially vertically because of the structure of the short subframe.

In this case, said point A of said suspension arm is advantageously coupled to said mini-bureau in said curved terminal part.

In a preferred solution, said short subframe has a recess allowing the passage of a gearbox nose.

Thus the gearbox and at least one of the fixings between the short subframe and the side members can be placed in the immediate proximity of each other.

In this case, said recess is preferably formed in said curved terminal part of at least one of said rails.

The invention also relates to a motor vehicle equipped with a structure for supporting a front end, said support structure comprising a short subframe on which a suspension arm is mounted for each wheel of said front end, said suspension arm being of the boomerang-shaped type in which one end, called the support end (E), of a rotating part is intended to be coupled to a wheel, while the other end, called the front joint (A), and the median part of the arm, called the rear joint (B), are intended to be coupled to said short subframe, said short subframe having a body on either side of which there extend toward the front of the vehicle two rails, each intended to be coupled by screwing to a side member of said vehicle, characterized in that each of said rails has means for coupling to said side member in an area located in front of said point A of said suspension arm with respect to the longitudinal axis of said vehicle, said coupling means comprising at least one hollow body for the passage of screwing means for the purpose of coupling said rail to said side member.

BRIEF DESCRIPTION OF THE DRAWINGS

Other features and advantages of the invention will be made clearer by the following description of a preferred embodiment of the invention, provided as an illustrative and non-limiting example, and by the appended drawings, of which.

DETAILED DESCRIPTION OF THE INVENTION

Figure 4:
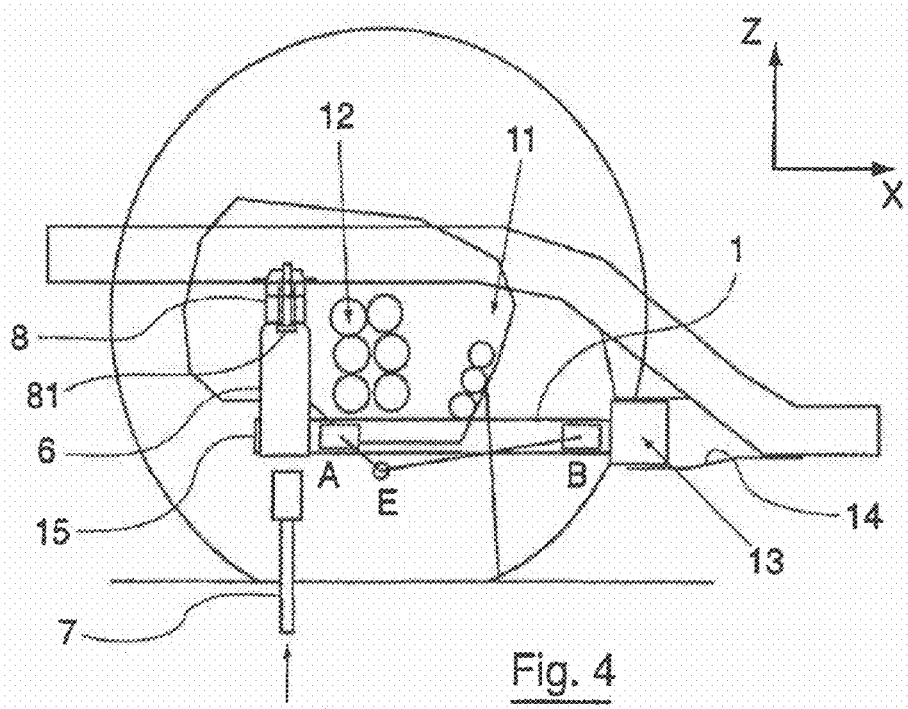
FIGS. 4 and 5 are schematic views of a front fixing structure of a short subframe according to the invention, from the side and from below respectively.
Figure 5:
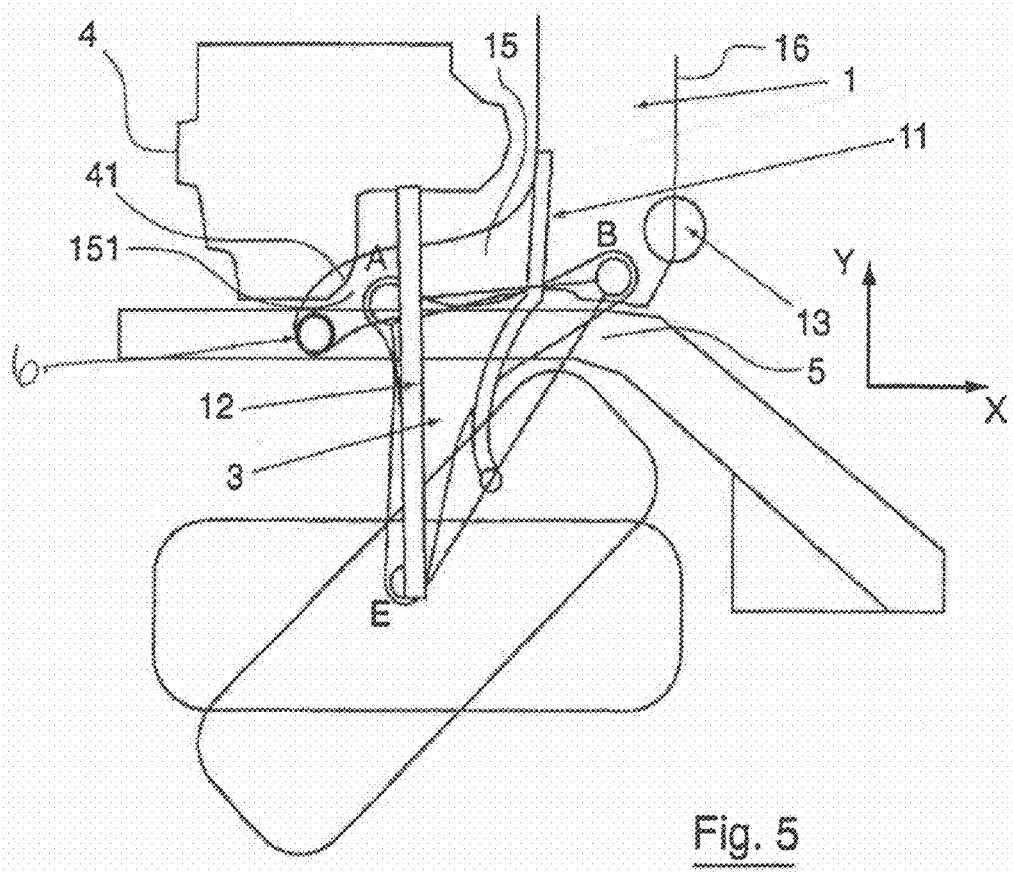

With reference to FIGS. 4 and 5, it should be noted that a front structure incorporating a short subframe is intended to be prepared off-line, and comprises the assembly, before coupling to the vehicle body, of tie rods 11 (different positions of the links being shown in FIG. 4), an anti-roll bar (not shown), torque links (not shown), and suspension arms (or wishbones) 3.

It should also be noted that the suspension arms are conventionally of the boomerang type, each arm having one of its ends supporting a rotating part (point E) and intended to be coupled to a wheel, and having a front joint (point A) and a rear joint (point B) which are intended to be coupled to the short subframe 1.

The assembly of the different members is carried out in such a way as to allow the travel of the surrounding movable elements such as the suspension arms 3 (points A, B and E), the tie rods 11, the lateral transmissions 12 (different positions of a transmission being shown in FIG. 4) and the anti-roll bar.

The short subframe 1 is then connected to the body in the rear part with resilient blocks 13 which are housed in enclosures under the floor 14.

The short subframe must also be coupled to the side members 5 of the vehicle.

According to the principle of the invention, each of the rails 15, which extend from the main body 16 of the short subframe and are made in one piece with it, has means 6 for coupling the short subframe to the side members, in the form of a hollow body allowing the passage of screwing means 7.

These screwing means enable the fixing means of the short subframe to be screwed to the side member, these fixing means being described more fully below.

In the present embodiment, the coupling means are composed of a tubular part 6 extending in one piece between a rail of the short subframe and the corresponding side member 5.

Figure 1:
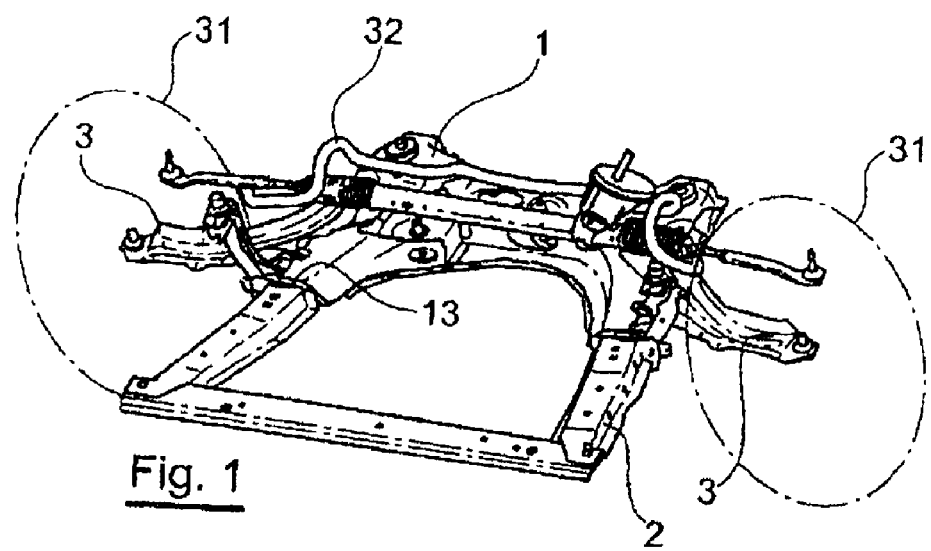
FIG. 1 is a perspective view of a motor vehicle subframe in its immediate environment.
Figure 6:
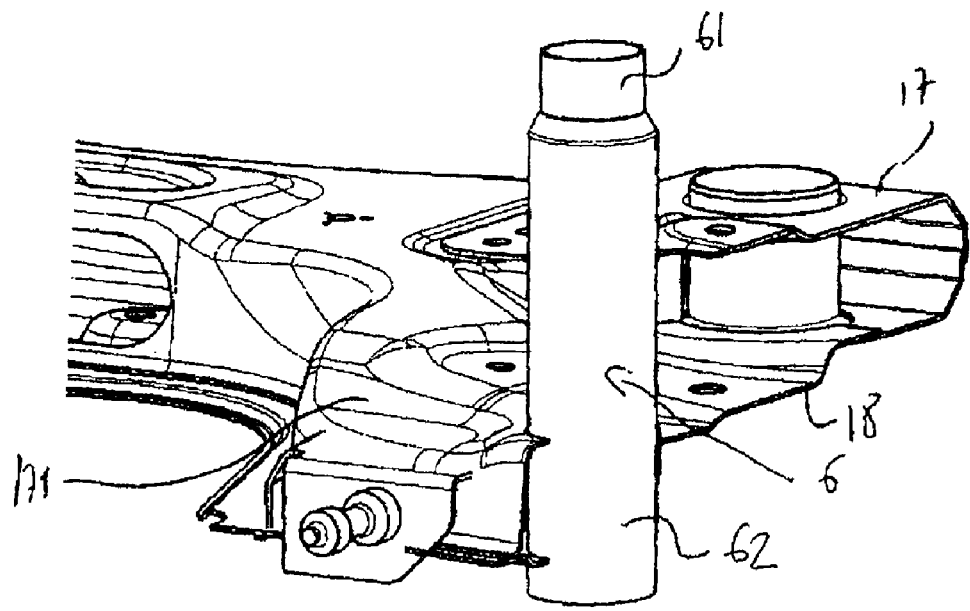
FIG. 6 is a perspective view of means for coupling a short subframe to a side member according to the invention.
Figure 2:
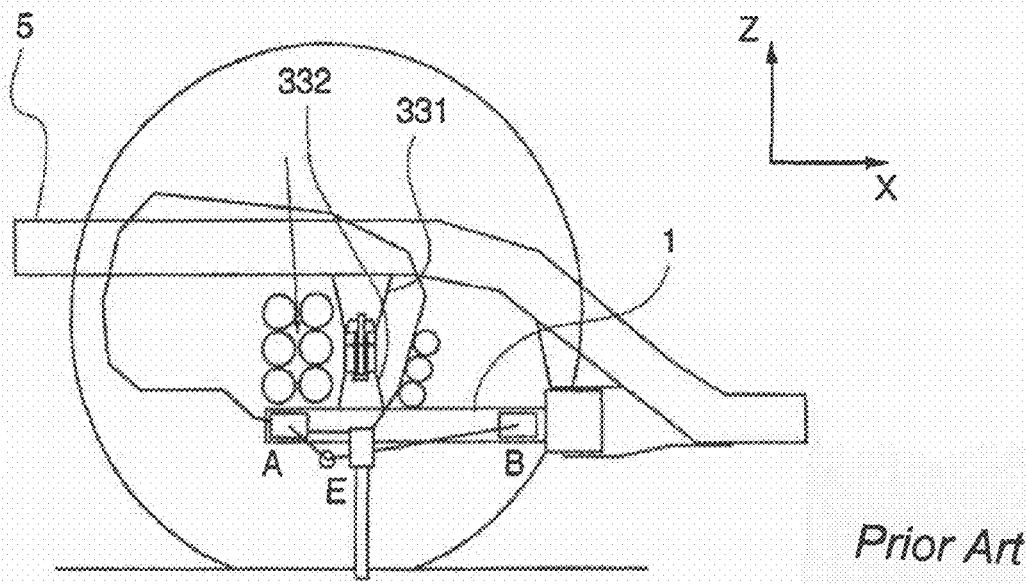
FIGS. 2 and 3 are schematic views of a front fixing structure of a short subframe according to the prior art, from the side and from below respectively.
Figure 3:
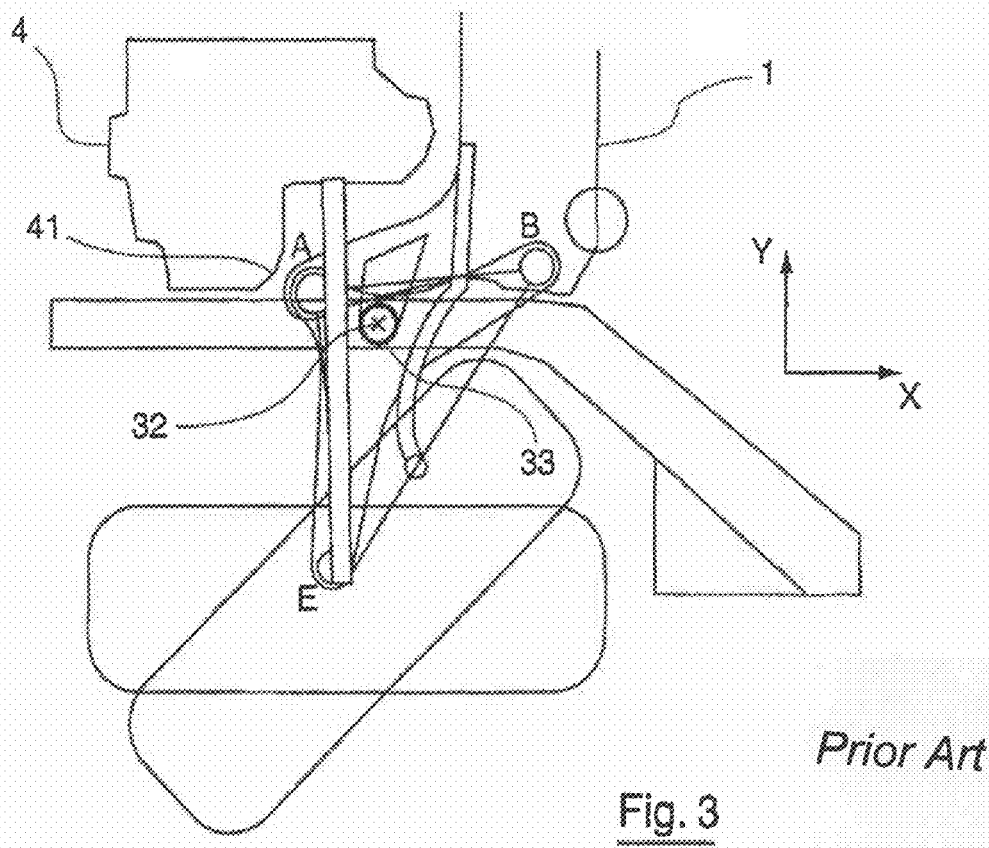

As shown in FIG. 6, the short subframe is of the mechanically welded type and is formed in the present case by the assembly of an upper shell 17 and a lower shell 18 which together form a hollow structure with a closed cross section.

As shown, each of the shells 17, 18 of the short subframe has a hole at the end of each rail for the passage of a tubular part 6, thus forming a housing in which the tubular part 6 is inserted.

The tubular part 6 is fixed to the short subframe by welding it to each of the shells 17, 18.

The tubular part 6 also has two portions 61, 62, each in the extension of the other, the portion 61 being intended to be placed within the inside of the side member 5 and having a diameter smaller than that of the portion 62 which is inserted into the rail of the short subframe.

The smaller-diameter portion 61 is intended to receive, by force fitting, a resilient joint 8 with a vertical axis.

During assembly, the screwing means 7 in the body assembly plant can access, via the inside of the tubular part 6, the screw 81 which locks the inner ring of the resilient joint 8 to the lower face of the side member 5.

With reference to FIG. 5, it should be noted that the rails 15 extend from the main body 16 of the short subframe while substantially following the corresponding side members, and each rail has a terminal part 151 curved toward the side member 5 and terminating substantially in vertical alignment with the side member 5.

It should be noted that the point A of the suspension arm is coupled in this terminal part 151 of the rail.

Additionally, as shown in FIG. 6, the pressed form of the upper shell 17 of the short subframe has a recess 171 forming a space into which the nose 41 of the gearbox 4 can be fitted.

This recess is provided in the terminal part 151 of one of the rails 15 of the short subframe.

The invention claimed is:

1. A structure supporting a motor vehicle front end assembly, comprising:
   a short subframe including a body and rails positioned on either side of said body, and said rails extend toward a front of said vehicle;
   a suspension arm mounted for each wheel of said front end assembly, said suspension arm including a support end to support a rotating part and a front joint and a rear joint coupled to said short subframe; and
   coupling units to couple each of said rails to a side member of said vehicle such that said subframe is coupled to the side member only in an area located in front of said front joint of said suspension arm with respect to a longitudinal axis of said vehicle, said coupling unit comprising at least one hollow body for the passage of a screwing unit to couple said rail to said side member.

2. The structure supporting a front end assembly as claimed in claim 1, wherein said at least one hollow body comprises at least one tubular part extending in one piece between said side member and said rail.

3. The structure supporting a front end assembly as claimed in claim 1, wherein said rails have a housing in which said coupling units are inserted.

4. The structure supporting a front end assembly as claimed in claim 2, wherein said short subframe includes an upper shell and a lower shell, at least the upper shell having at least one hole for the passage of said tubular part.

5. The structure supporting a front end assembly as claimed in claim 1, wherein said at least one hollow body comprises at least two tubular parts each extending in one piece between said side member and said rail, said short subframe includes an upper shell and a lower shell, and said upper shell and said lower shell each have at least one hole for the passage of one of said tubular parts.

6. The structure supporting a front end assembly as claimed in claim 5, wherein each of said tubular parts is welded to a respective one of said shells.

7. The structure supporting a front end assembly as claimed in claim 1, wherein said coupling units each comprise at least one resilient joint that is locked to said side member to couple said rail to said side member.

8. The structure supporting a front end assembly as claimed in claim 7, wherein said at least one resilient joint is force-fitted into said body of each of said coupling units.

9. The structure supporting a front end assembly as claimed in claim 2, wherein said tubular part has two portions including a first of said portions having a smaller diameter than a second of said portions, and said first of said portions receives a resilient joint by force fitting.

10. The structure supporting a front end assembly as claimed in claim 1, wherein each of said rails extends in a vicinity of said side member from said body and has a terminal part curved toward said side member until each of said rails is in vertical alignment with said side member.

11. The structure supporting a front end assembly as claimed in claim 10, wherein said front joint of said suspension arm is coupled to said short subframe in said curved terminal part.

12. The structure supporting a front end assembly as claimed in claim 1, wherein said short subframe has a recess for passing a nose of a gearbox.

13. The structure supporting a front end assembly as claimed in claim 10, wherein said short subframe has a recess for passing a nose of a gearbox and said recess is formed in said curved terminal part of at least one of said rails.

14. A motor vehicle equipped with a structure supporting a front end assembly, said support structure comprising:
   a short subframe including a body and rails positioned on either side of said body, and said rails extend toward a front of said vehicle;
   a suspension arm mounted for each wheel of said front end assembly, said suspension arm including a support end to support a rotating part and a front pivot and a rear pivot coupled to said short subframe; and
   coupling units to couple each of said rails to a side member of said vehicle such that said subframe is coupled to the side member only in an area located in front of said front pivot of said suspension arm with respect to a longitudinal axis of said vehicle, said coupling unit comprising at least one hollow body for passing a screwing unit through to couple said rail to said side member.

15. The motor vehicle equipped with a structure supporting a front end assembly as claimed in claim 14, wherein said at least one hollow body comprises at least two tubular parts each extending in one piece between said side member and said rail, said short subframe includes an upper shell and a lower shell, and said upper shell and said lower shell each has at least one hole through which one of said tubular parts passes.

16. The motor vehicle equipped with a structure supporting a front end assembly as claimed in claim 14, wherein said coupling units each comprise at least one resilient joint inside said body of said each of said coupling units, and said resilient joint is locked to a lower face of said side member to couple said rail to said side member.

17. The structure supporting a front end assembly as claimed in claim 1, wherein said body of said short subframe is a single body and said rails are two rails positioned on either side of said body, said two rails each extend from the single body toward the front of said vehicle, and said single body is positioned behind a transmission of said vehicle in a longitudinal direction of the vehicle.

18. The structure supporting a front end assembly as claimed in claim 17, wherein each of the two rails are connected to the side member in a position that overlaps the transmission in the longitudinal direction of the vehicle.

19. The structure supporting a front end assembly as claimed in claim 17, wherein each of the two rails and the single body are a single piece.

20. The structure supporting a front end assembly as claimed in claim 1, wherein the short subframe is not coupled to the side member of said vehicle in an area located behind said front joint of said suspension arm.

* * * * *